United States Patent Office

3,748,204
Patented July 24, 1973

3,748,204
PROCESS FOR PRODUCING LAMINATED PAPER
Teruo Murayama, Saitama, Kazuhiko Honda, Tokyo, and Tsuneo Kasugai and Nobuhiko Minagawa, Shizuoka, Japan, assignors to Fuji Photo Film Co., Ltd., Kanagawa, Japan
No Drawing. Filed Feb. 23, 1971, Ser. No. 118,167
Claims priority, application Japan, Feb. 23, 1970, 45/15,381
Int. Cl. B29c 19/02; B44d 1/50
U.S. Cl. 156—244     12 Claims

ABSTRACT OF THE DISCLOSURE

Method of producing a synthetic resin-laminated paper by simultaneously coating a synthetic resin on both sides of the paper and applying microwave energy at the same time.

BACKGROUND OF THE INVENTION

(1) Field of the invention

The present invention relates to a process for producing laminated paper, which is prepared by laminating paper with synthetic resin. More particularly, the present invention is concerned with synthetic resin paper lamination employing microwave energy.

(2) Description of the prior art

Heretofore, a number of processes for producing laminated paper in which the paper is covered with a synthetic resin have been known. Illustrative of these are the following: an extrusion coating method comprising coating paper with a fused resin; a wet lamination method, which comprises applying an adhesive to paper and superimposing a synthetic resin film onto the adhesive layer during which the solvent does not evaporate from the adhesive. The paper and the synthetic resin film are laminated firmly while evaporating the solvent, thus providing a large adhesive strength; a dry lamination method, which comprises applying a pressure-sensitive adhesive to the paper, laying a snythetic resin film on the paper and pressing to cause adhesion; and a hot-melt lamination method, which comprises applying a melted resin to paper, superimposing a synthetic resin film thereon, and heating while pressing the superimposed matter to bind the paper and the synthetic resin film. However, in practicing these methods, it has been known as the result of many experiments that laminated paper having a high adhesive strength cannot be obtained if the temperature at the interface between the paper and the synthetic resin layer is not sufficiently high. Nevertheless, in general, the paper and the synthetic resin do not adhere sufficiently if a laminating apparatus is driven at high speed so as to increase efficiency of production.

One method for solving this problem, is to heat the laminated paper, exteriorly by applying heated air or by a heated roller. However, even with this heating method, the interface temperature is not raised high enough, because the heat is applied to the surface of the synthetic resin layer and/or the paper which has a low heat conductivity. Consequently, sufficient heating of the interface requires a long period of time because of the low heat conductivity of the synthetic resin layer or paper. This gives rise to a large-size apparatus and an increase in the cost of the heating source when laminationg at a high speed, since the heating region has to be lengthened and a heating source having a higher temperature is required.

SUMMARY OF THE INVENTION

It is therefore the summary object of the present invention to provide a process for preparing laminated paper, which lacks the disadvantages discussed above.

Accordingly, the present invention relates to a process for producing laminated paper by laminating the paper with a synthetic resin, by applying a microwave to the laminated paper while forming or after forming a synthetic resin layer on the paper.

DETAILED DESCRIPTION OF THE INVENTION

Any kind of paper may be used for practicing this invention. Illustrative, however, are kraft paper, glassine paper, and paperboard. Since the present invention aims at increasing the adhesive strength between the paper and the synthetic resin layer laid thereon, the back of the paper may be provided with materials, such as another paper, cloth, leather, wood and a synthetic resin film or such substances as previously applied. In short, the object of this invention applies to each interface of paper-synthetic resin or paper-adhesive-synthetic resin.

Polyethylene, polypropylene, polyvinyl chloride, polystyrene and cellulose acetate may be used preferably as the synthetic resin. However, it will be understood that other film-forming thermoplastic resins can be similarly used. Naturally, copolymers containing monomers of such synthetic resins may be utilized.

As the method for applying microwaves, there is a method which comprises radiating microwave energy into wave guides or an oven to cause the microwave energy radiated from the wave guides or oven to be absorbed by the laminated paper. In another method, the microwave energy is absorbed by passing the laminated paper through the wave guides or oven. When the latter method in which the laminated paper passes continuously through the wave guides or oven is adopted, the laminated paper can be treated continuously with microwave energy in the lamination process. In addition, when the laminated paper does not effectively absorb the microwave energy, a plurality of rectangular wave guides should be employed. In this case, the sides of each wave guide should be shortened and each wave guide connected in zig-zag fashion. By passing the laminated paper through the center of said wave guides, the laminated paper can be heated uniformly and rapidly, because the electric field in the wave guides is enhanced. Consequently, the microwave energy can be absorbed effectively.

Application of the above-mentioned microwaves is carried out while forming or after forming the synthetic resin layer on the paper. In the latter case, the practice is comparatively simple. Namely, the microwaves are applied to the laminated paper, which is in a state such that the synthetic resin adheres to the paper in some degree. By applying microwaves, the synthetic resin is heated again and further adheres to the fibers of the paper at deeper levels.

However, the former case which comprises applying the microwave while forming the synthetic resin layer requires a special modification of the apparatus. That is, in the planning of the apparatus, since heating which is necessary to form the synthetic resin layer and to fuse again is carried out by application of microwaves, a means for forming the synthetic resin layer and microwave heating must be established in the same apparatus. In practicing this invention, however, this presents no problem, since the prior art is sufficient to enable one skilled in the art to make the necessary apparatus modifications. The effect of this invention is further enhanced by pressing the laminated paper immediately after the application of the microwaves.

The present invention will be better understood from the following examples, which are merely intended as an illustration and not as a limitation of the present invention. Examination of the adhesive property between the paper and the synthetic resin layer in the examples was performed by the method described in the American Standard of Testing Materials (ASTM) D-903. That is, the adhesive strength was examined by measuring the peeling resistance of test strips, which were 25 mm. in width, by peeling the test strip in a direction of 180° at a peeling rate of 150 mm./min. Temperature and relative humidity during examination were 23° C. and 50%, respectively.

EXAMPLE 1

A vinyl acetate latex adhesive (trade name "Vinal AM" produced by Kanae Chemical Co.) was applied to the surface of a high-grade paper used for printing having 80 g./m.$^2$, 1 m. of width. A plasticized polyvinyl chloride film having a thickness of 30$\mu$ was laminated thereon by means of a press roll. After heating the thus resulting laminated paper at a temperature of 105° C. for 20 seconds with a hot blast, a microwave treatment was applied at a rate of 150 mm./min. in a microwave application apparatus equipped with wave guides of 25 kw. output. The length of the applying zone was 3 m. The adhesive strength between the polyvinyl chloride film and the paper in this laminated paper was 180 g./25 mm. In contrast, the adhesive strength of the laminated paper which was prepared by excluding the microwave treatment was 65 g./25 mm. This clearly demonstrates that the adhesive strength of the laminated paper of this invention was remarkably improved.

EXAMPLE 2

A vinyl acetate acrylate adhesive (trade name "Esdine 6300" produced by Sekisui Chemical Co.) was applied to kraft paper having 100 g./m.$^2$ and 1 m. in width. After drying the adhesive, a film of high density polyethylene was laminated to the paper by means of a press roll. Microwaves were then applied by passing at a rate of 100 m./min. through an application apparatus as used in Example 1. The adhesive strength in the resulting polyethylene laminated paper was 245 g./25 mm., which was compared with that of 110 g./25 mm. in the laminated paper adhered only by means of a press roll.

EXAMPLE 3

To the surface of kraft paper having a width of 1 m. and a weight of 100 g./m.$^2$, a low density polyethylene as the first coating layer and a crystalline polypropylene as the second coating layer were applied at a rate of 80 m./min. by co-extrusion. The thickness of each layer was about 20$\mu$ and 30$\mu$ respectively.

Microwave treatment was then introduced by passing the thus resulting laminated paper through an application apparatus as used in Example 1 at a rate of 80 m./min. The adhesive strength between the paper and the polyethylene in the resulting laminated paper was 210 g./25 mm. In contrast, the adhesive strength of the laminated paper which was not treated by the above-mentioned microwave application was 44 g./25 mm.

EXAMPLE 4

After applying a synthetic rubber latex adhesive (trade name "Polysol PA-5" produced by Kobunshi Kagaku Co.) to an electric insulating paper of 75 g./m.$^2$, a thick cellulose acetate film of 25$\mu$ was adhered thereon in a non-drying state. The resulting laminated paper was divided into two sheets. One of the sheets was heated at a temperature of 105° C. for 20 seconds by infrared rays, and the other was treated with microwave application by passing at a rate of 50 m./min. through an application apparatus as used in Example 1. The adhesive strength of the laminated paper heated by infrared rays was only 160 g./25 mm. as compared to a strength of 215 g./25 mm. obtained when using the microwave treatment of the present invention.

EXAMPLE 5

To both surfaces of high-grade paper used for printing having 140 g./m.$^2$, low density polyethylene was applied at a rate of 100 m./min. by extrusion coating. The thickness of each layer was about 20. Microwave application was then applied by passing the resulting laminated paper through a microwave application apparatus as used in Example 1 at a rate of 100 m./min. The adhesive strength between the paper and the polyethylene not treated with microwave was 40 g./mm. as compared to an adhesive strength of 185 g./25 mm. in the laminated paper treated by the microwave application.

In the present invention, the paper is a heat-generator, because a very small amount of water included in the paper at common preservation conditions absorbs the energy of microwaves effectively to promote heating of the substrate. Therefore, the interface is heated internally regardless of the thickness of paper substrate and/or lamination of the film. Furthermore, in the laminated paper, of this invention, since the moisture holding time by the paper during microwave application is prolonged by the synthetic resin film, heating of the substrate and the interface becomes more effective and the degradation (so-called "scorch") of the paper during the microwave application is prevented.

According to this invention, it is possible to practice high speed lamination by applying microwave energy having a wavelength of 3-30 cm. to the laminated paper after formation thereof. Accordingly, the interface between the paper and the synthetic resin layer is effectively heated and the adhesive strength between the papr and synthetic resin is improved. Moreover, the interface can be heated in a short period of time because of the entirety of the paper (the substrate and the synthetic resin as the coating material) becomes a heat generator when the microwaves are applied. Accordingly, it is possible to increase the lamination speed if the process of this invention is used in a step for producing the laminated paper by the extrusion coating method. If the process of this invention is used in a step of a process for producing laminated paper, such as the hot-melt method in which adhesives such as polyvinyl acetate and polyurethane are used, the heating effect is further improved. This is due to the fact that the adhesive themselves become a heat generator through microwave application.

Although the present invention has been adequately disclosed in the foregoing specification and examples included therein, it is readily apparent that various changes and modifications may be made without departing from the scope thereof.

What is claimed is:

1. In a process for producing a synthetic resin-laminated paper which comprises simultaneously coating a synthetic resin on both sides of a paper support, the improvement which comprises increasing the adhesion between the paper support and the synthetic resin coatings by applying microwave energy to said laminated paper while forming the synthetic resin layers on the paper support whereby the residual water content of the paper support absorbs the applied microwave energy and generates heat at the interfaces between the paper support and the synthetic resin coatings.

2. The process of claim 1, wherein the microwave energy is applied after the synthetic resin layers are formed on the paper support.

3. The process of claim 1, wherein the microwave energy is applied during the formation of the synthetic resin layers on the paper support.

4. The process of claim 1, wherein the laminated paper formed is further subjected to pressing immediately following the application of the microwave energy.

5. The process of claim 1, wherein the wave length of said microwave energy ranges from 3 to 30 cm.

6. The process of claim 1, wherein said paper support comprises kraft paper, glassine paper or paper board.

7. The process of claim 1, wherein said resin is a film-forming thermoplastic resin.

8. The process of claim 1, wherein said resin is selected from the group consisting of polyethylene, polypropylene, polyvinyl chloride, polystyrene and cellulose acetate.

9. The process of claim 1, wherein said resin is applied to both sides of said paper support by a hot-melt coating process, wherein an adhesive is applied to said paper support before applying said resin thereto in order to increase the adhesion between said paper support and said resin layers coated thereon.

10. The process of claim 9, wherein the wave length of said microwave energy varies from 3 to 30 centimeters.

11. In a process for simultaneously coating both sides of a paper sheet support with a film-forming synthetic resin to form a resin-laminated paper comprising simultaneously extruding a film-forming thermoplastic resin onto both sides of said paper sheet support, the improvement comprising increasing the adhesion between the paper support and both synthetic resin coatings by applying microwave energy having a wave length of from 3 to 30 centimeters to said resin-laminated paper during said extrusion to increase the adhesion between said resin layers and said paper sheet support whereby the residual water content of the paper support absorbs the applied microwave energy and generates heat at the interfaces between the paper support and the synthetic resin coatings.

12. In a process for simultaneously coating both sides of a paper sheet support with a film-forming synthetic resin to form a resin-laminated paper comprising simultaneously extruding a film-forming thermoplastic resin onto both sides of said paper sheet support without the use of an adhesive, the improvement comprising increasing the adhesion between the paper support and both synthetic resin coatings by applying microwave energy having a wave length of from 3 to 30 centimeters to said resin-laminated paper during said extrusion whereby the residual water content of the paper support adsorbs the microwave energy and generates heat at the interfaces between the paper support and the synthetic resin coatings to firmly bond both synthetic resin coatings directly to said paper support.

References Cited

UNITED STATES PATENTS

| | | | |
|---|---|---|---|
| 2,865,790 | 12/1958 | Baer | 117—93.1 |
| 3,281,347 | 10/1966 | Winder | 156—272 |
| 3,291,671 | 12/1966 | Hecht | 156—273 |
| 3,484,179 | 12/1969 | Adams et al. | 117—93.1 DH |
| 3,619,538 | 11/1971 | Kallenburn | 117—93.1 DH |
| 3,448,000 | 6/1969 | Paquin et al. | 161—250 |
| 3,471,357 | 10/1969 | Bildusas | 161—250 |

DOUGLAS J. DRUMMOND, Primary Examiner

U.S. Cl. X.R.

117—93.1 DH, 93.31; 156—272; 219—10.55